United States Patent [19]

Kuntman

[11] Patent Number: 5,077,558

[45] Date of Patent: Dec. 31, 1991

[54] AIRBORNE WIND SHEAR DETECTION WEATHER RADAR

[75] Inventor: Daryal Kuntman, Highland Beach, Fla.

[73] Assignee: Allied-Signal Inc., Morris Township, Morris County, N.J.

[21] Appl. No.: 627,781

[22] Filed: Dec. 14, 1990

[51] Int. Cl.$^5$ .............................................. G01S 13/95
[52] U.S. Cl. .................................................... 342/26
[58] Field of Search ........................................ 342/26

[56] References Cited

U.S. PATENT DOCUMENTS

| | | | |
|---|---|---|---|
| 4,223,309 | 9/1980 | Payne | 342/26 |
| 4,533,915 | 8/1985 | Lucchi et al. | 342/26 |
| 4,600,925 | 7/1986 | Alitz et al. | 342/26 X |
| 4,835,536 | 5/1989 | Piesinger et al. | 342/26 |
| 4,940,987 | 7/1990 | Frederick | 342/26 |

Primary Examiner—Gilberto Barrón, Jr.
Attorney, Agent, or Firm—Donald B. Paschburg; Howard G. Massung; Robert A. Walsh

[57] ABSTRACT

An airborne wind shear detection radar includes a transmitter for transmitting successive radar beams into airspace in front of an aircraft and a receiver for receiving reflected signals. The radar analyzes the received reflected signals in the frequency domain to determine if a wind shear condition exists in the airspace in front of the aircraft.

17 Claims, 2 Drawing Sheets

AIRBORNE WIND SHEAR DETECTION WEATHER RADAR

BACKGROUND OF THE INVENTION

1. Field of the Invention

The present invention is related to wind shear detection and more specifically, to wind shear detection with airborne weather radar systems.

2. Description of the Prior Art

Known airborne weather radar systems used by the commercial and general aviation type aircraft are designed to detect water associated with precipitation. Usually, high water content indicates high rainfall rate which might be associated with turbulent weather conditions.

Newer airborne weather radar systems have the additional capability of performing doppler signal processing for detecting turbulence. These radar systems compare spectral bandwidth of the return signals against a threshold. If the threshold is exceeded, then it is assumed that the scanned area contains turbulent conditions.

None of the existing airborne weather radar systems, however, have the capability of detecting wind shear. Characteristics of wind shear associated with microburst phenomenon are such that wind shear cannot be detected by conventional doppler signal processing methods normally used for turbulence detection. As wind shear can cause considerable loss of altitude at critical phases of flight, an airborne wind shear detection weather radar is needed.

SUMMARY OF THE INVENTION

In accordance with the present invention an airborne wind shear detection weather radar is provided which transmits successive beams into airspace in front of an aircraft, receives reflected signals and analyzes the reflected signals for a wind shear condition. Most of the wind shear detection weather radar system's components are similar to typical airborne weather radar systems with turbulence detection capability. The hardware of the present invention, however, includes modifications of these standard components as well as a doppler signal processor and a wind shear threshold processor.

DETAILED DESCRIPTION OF THE INVENTION

Figure 1:
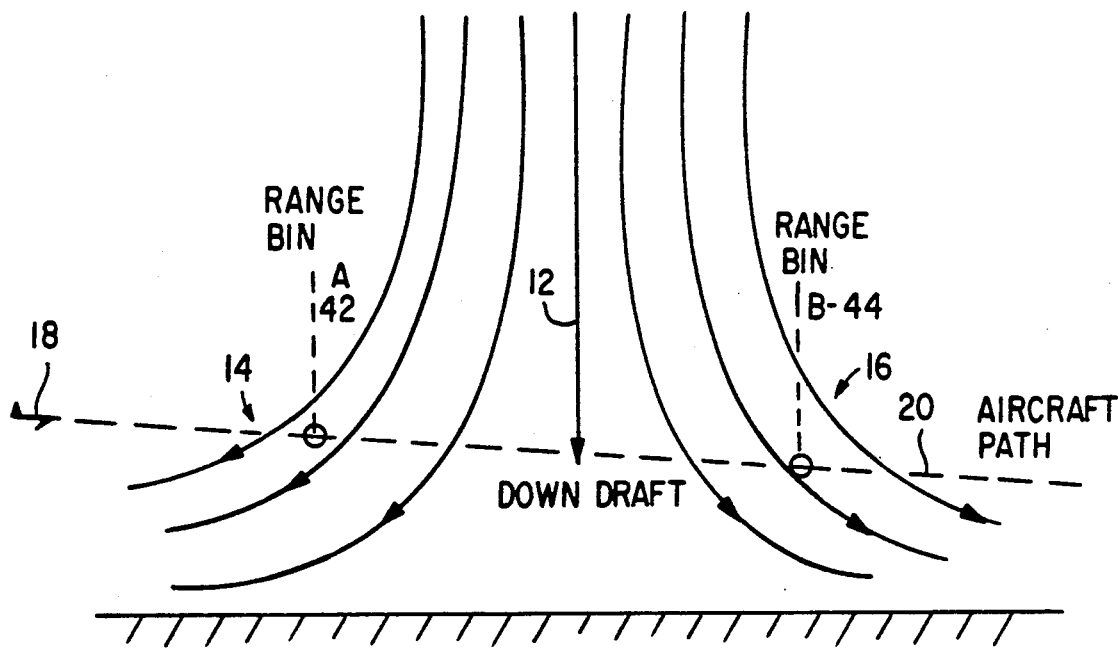
FIG. 1 illustrates wind characteristics of a typical microburst phenomenon.

FIG. 1 illustrates wind characteristics of a wind shear condition associated with a microburst 10, wherein a down draft exists near the center 12 of the microburst 10 and the wind horizontally spreads out near a forward edge 14 and a trailing edge 16 of the microburst 10. As a result, an aircraft 18 which traverses the microburst 10 along a path 20 will experience an increased head wind when it first contacts the microburst 10 at the forward edge 14. As the aircraft 18 nears the center 12 of the microburst 10 it experiences a strong down draft and a shift from head wind to tail wind. As the aircraft 18 nears the trailing edge 16 of the microburst 10, it experiences an increased tail wind. This change from head wind to tail wind with a strong down draft is the characteristics of wind shear. It can cause considerable loss of altitude at critical phases of flight.

Figure 2:
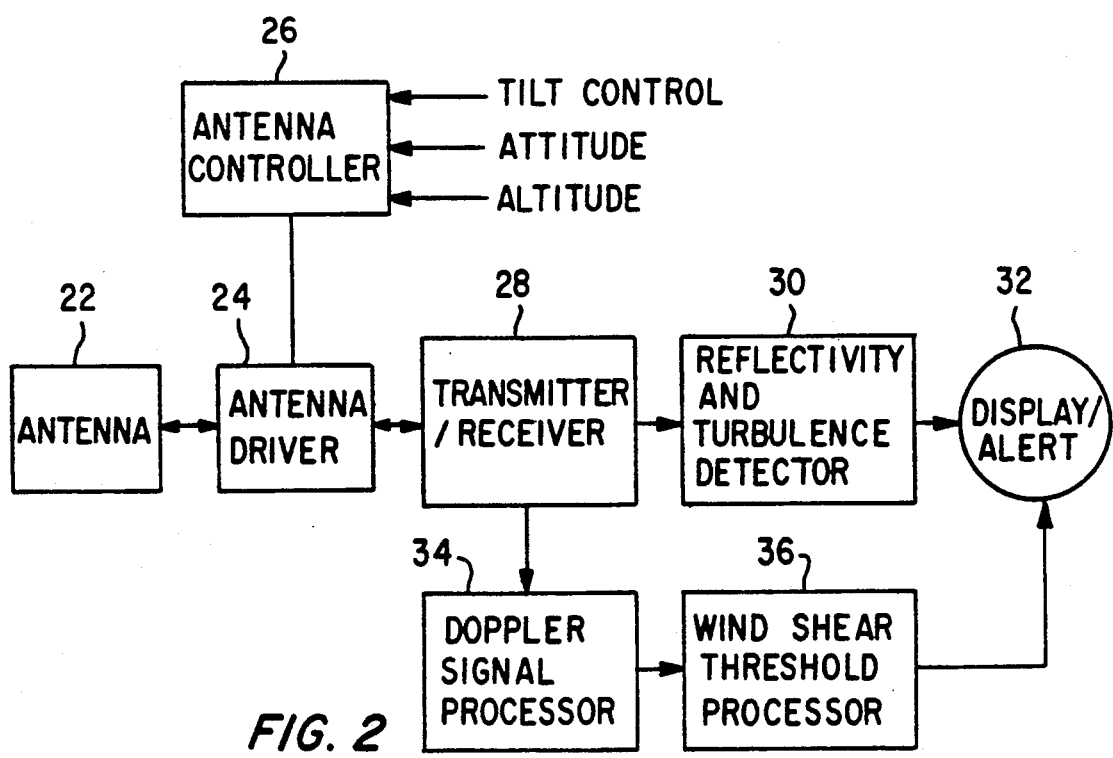
FIG. 2 illustrates a block diagram of a wind shear detection weather radar in accordance with the present invention.

FIG. 2 illustrates a block diagram of a wind shear detection weather radar in accordance with a preferred embodiment of the present invention wherein wind shear detection capabilities are incorporated into an existing weather radar with turbulence detection capability. Wind shear detection can be incorporated as a mode of operation of the weather radar and therefore could be activated during the landing and takeoff phases of flight. During the cruise, climb and approach phases of flight the radar could be operated in any of its normal modes currently available.

Included in the wind shear detection weather radar of the present invention are an antenna 22, an antenna driver 24, an antenna controller 26, a transmitter/receiver 28, a reflectivity and turbulence detector 30, a display/alert 32, a doppler signal processor 34, and a wind shear threshold processor 36. The antenna 22, the antenna driver 24, the antenna controller 26, the transmitter/receiver 28, the reflectivity and turbulence detector 30 and the display/alert 32 function in much the same way as they do in existing weather radars with minor modifications for the wind shear detection mode. The modifications are as follows.

When operating in typical weather detection modes, the antenna controller 26 and the antenna driver 24 normally cause the antenna 22 to scan in the azimuth axis over a range of ±60 degrees to 90 degrees from the aircraft longitudinal centerline. In the wind shear detection mode, however, it is preferable to reduce the azimuth scan angle to ±10 degrees to 20 degrees so as to provide higher update rates. Also, when operating in typical weather detection modes, the antenna controller 26 and the antenna driver 24 normally control the elevation axis of the antenna 22 so that the antenna beam is maintained at a fixed angle with respect to the horizon. The fixed angle is selected by the operator using a tilt angle control located in the cockpit. This is accomplished by using the aircraft attitude (pitch and roll) data. In the wind shear detection mode, however, the antenna controller 26 and the antenna driver 24 maintain the antenna beam at an optimal angle for wind shear detection, independent of the tilt angle control in the cockpit. In a preferred embodiment, the optimal angle is calculated to point the antenna beam to the ground approximately at the maximum range of wind shear detection processing. This optimal angle is a function of altitude above ground level data. Five nautical miles is a typical maximum range for wind shear detection processing.

When the wind shear detection weather radar of FIG. 2 is in the wind shear detection mode, it is preferable that the transmitter/receiver 28 select the pulse width of the transmitted signal so as to provide for a resolution of less than approximately one-tenth of a typical microburst diameter. A typical microburst diameter can be as small as 0.4 nautical miles. It is also preferable that the pulse repetition frequency (PRF) of the transmitted signal be selected so as to provide unambiguous doppler frequency resolution capability for speeds of up to a minimum of 250 knots. Further, it is preferred that the frequency of the transmitter/receiver 28 be fully coherent to provide doppler frequency resolution capability corresponding to a velocity of less than five knots. Coherent means that the transmitter and receive frequencies are offset from each other by a fixed frequency. The variations of this offset frequency has to be kept to a minimum. At the operating frequency of a typical weather radar, 9345 MHz, one knot velocity corresponds to a doppler shift of approximately 16 Hz. In order to maintain system errors to a value below 5 knots, the frequency coherency (variations of the offset frequency) has to be below 80 Hz.

Also, the transmitter power and receiver performance should be selected to provide detection capability for targets with as little as 0dBZ reflectivity for wind shear detection with almost dry microbursts. dBZ is a well-known definition for reflectivity of weather targets compromise of many rain drops. 0dBZ corresponds to approximately 0.04 mm/hr. rainfall rate.

There are no modifications required for the reflectivity and turbulence detector 30 because it processes information from the transmitter/receiver 28 only during the typical weather detection modes of operation. It is not used during the wind shear detection mode.

The display/alert 32 must be modified to be capable of receiving information during the typical weather detection modes, from the reflectivity and turbulence detector 30, as well as during the wind shear detection mode, from the wind shear threshold processor 36.

Besides the above modifications to standard components of typical airborne weather radars with turbulence detection, the present invention also comprises a doppler signal processor 34 and a wind shear threshold processor 36. These processors operate as follows.

The reflected data after each transmission pulse is received and detected by the receiver (transmitter/receiver 28) which uses a coherent detection method to generate quadrature phase signals, I and Q channels. Coherent detection methods using I and Q channels are well-known to radar designers. The doppler signal processor 34 samples and stores these data time intervals corresponding to a range resolution of wind shear detection processing. Range resolution is well-known terminology for radar designers. 12.36 micro-seconds corresponds to one nautical mile. As an example, if there is a 5 nautical mile maximum range and a 0.04 nautical mile range resolution, the system requires 128 sets of data at a sampling frequency of approximately 2MHz. These samples are generally referred to as range bins.

Figure 3:
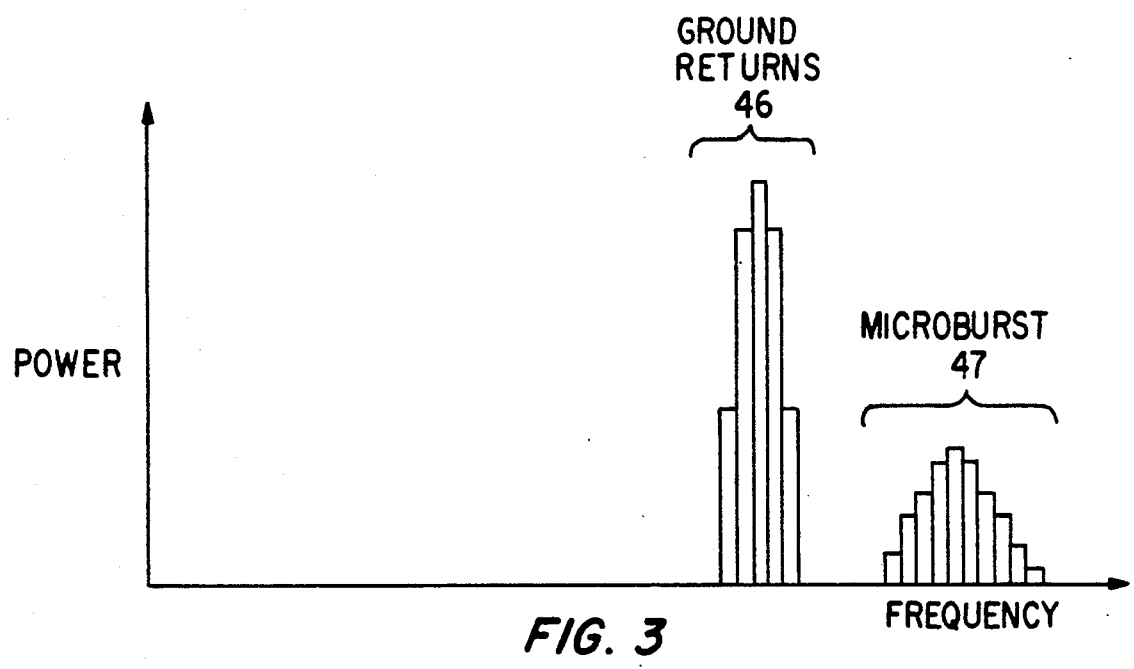
FIGS. 3 and 4 illustrate frequency domain data obtained in accordance with the present invention.
Figure 4:
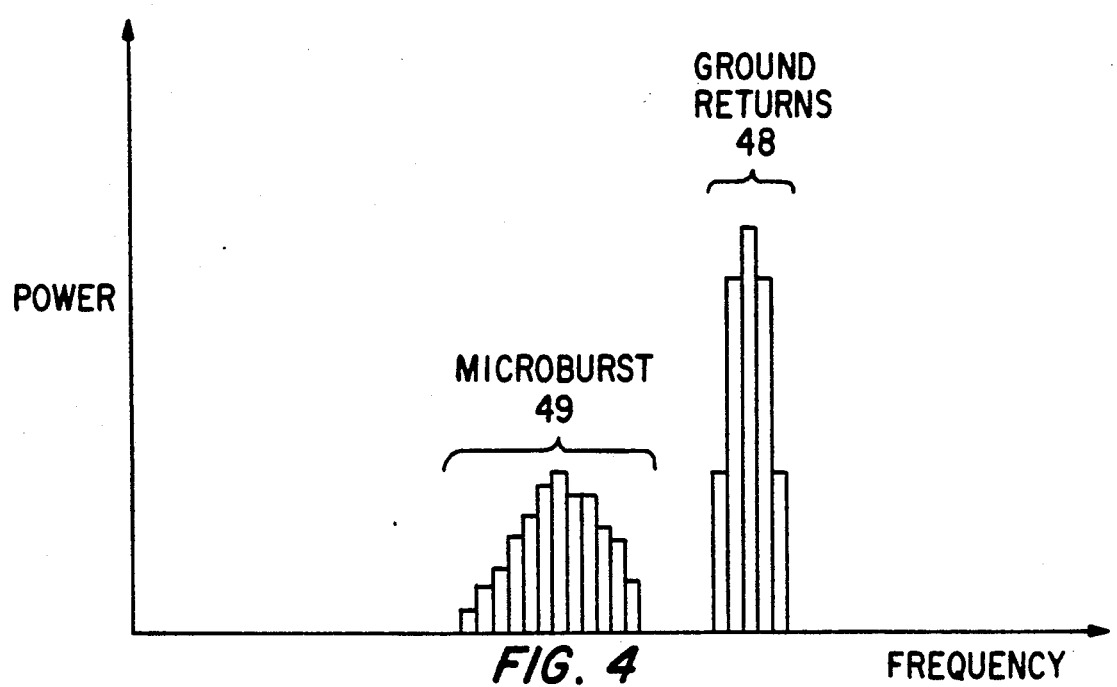

The doppler signal processor 34 converts the time domain data into frequency domain data. Any fast Fourier transformer (FFT) method as is known in the art can be used for the conversion. The time domain data corresponds to the data stored for a given range bin over many transmissions. Using the above-mentioned parameters, there would be 128 sets of frequency domain data corresponding to 128 range bins generated by the doppler signal processor 34. Typical frequency domain data for two range bins is shown in FIGS. 3 and 4. These correspond to range bin A 42 and range bin B 44 as marked on FIG. 1. In both cases the ground returns (46 of FIG. 3 and 48 of FIG. 4) appear at the frequency corresponding to the aircraft ground speed. For range bin A, FIG. 3, the microburst returns 47 appear at higher frequencies than the ground return frequency. For range bin B, FIG. 4, the microburst returns 49 are at lower frequencies. Returning to FIG. 2, the doppler signal processor 34 filters out the ground returns and calculates the mean doppler frequency of the other returns with respect to the ground return frequency. The resultant data is in terms of expected head or tail wind velocity for each range bin. This data is provided to the wind shear threshold processor 36.

The wind shear threshold processor 36 analyzes the wind velocity data for all range bins for each azimuth angle. The processing uses a sliding window calculation as is known in the art. In a preferred embodiment, the width of the window should be compatible with the size of a typical microburst diameter. One nautical mile, or when using the above-mentioned parameters, 25 range bins, can be considered a typical window width. The wind shear threshold processor 36 calculates the difference between the maximum and minimum wind velocities for the range bins in the window. These figures are compared against thresholds for wind shear. In a preferred embodiment, 10, 20 and 30 knots can be used for typical thresholds indicating mild, moderate and severe wind shear probabilities. The wind shear threshold processor 36 also detects changes from tail wind to head wind conditions across the window. If no wind shift from head to tail is detected, the severe wind shear probability threshold can be disabled. Under these conditions the maximum wind shift could be indicated as a moderate wind shear probability.

An aural alert (display/alert 32 of FIG. 2) can be generated any time a severe wind shear probability is detected. Additionally, the wind shear probability data can be sent to the display (display/alert 32 of FIG. 2) to be displayed to the flight crew. In a preferred embodiment, the wind shear probability data can be displayed in standard plan position indicator (PPI) format. For each azimuth angle, the probability data for a given window is displayed at the range corresponding to the center of the window. Colors can be used to provide means of easy interpretation of the data. Green, yellow and red are the colors preferably used in weather radar displays to indicate severity of the data.

It is not intended that this invention be limited to the hardware or software arrangement, or operational procedures shown disclosed. This invention includes all of the alterations and variations thereto as encompassed within the scope of the claims as follows.

I claim:

1. An airborne wind shear detection weather radar comprising:

antenna means for scanning azimuth axis of an aircraft;

antenna driver means connected to said antenna means, for causing said antenna means to scan;

antenna controller means connected to said antenna driver means to work with said antenna driver means to maintain said antenna means at an optimal angle for wind shear detection;

transmitter/receiver means connected to said antenna driver means for generating a transmitted signal and for receiving reflected data;

reflectivity and turbulence detector means connected to said transmitter/receiver means for processing information from said transmitter/receiver means;

display/alert means connected to said reflectivity and turbulence detector means and capable of receiving information from said reflectivity and turbulence detector means;

doppler signal processor means connected to said transmitter/receiver means for filtering out ground returns and for calculating mean doppler frequency of other returns with respect to said ground returns; and, wind shear threshold processor means connected to said doppler signal processor means for analyzing data from said doppler signal processor means and for providing wind shear detection information to said display/alert means.

2. An airborne wind shear detection weather radar as claimed in claim 1 wherein said antenna controller means and said antenna driver means cause said antenna means to scan in said azimuth axis over a range of plus or minus ten degrees to twenty degrees from said aircraft's longitudinal center line.

3. An airborne wind shear detection weather radar as claimed in claim 1 wherein said antenna controller means and said antenna driver means maintain said antenna means at an optimal angle for wind shear detection independent of a tilt angle control in said aircraft.

4. An airborne wind shear detection weather radar as claimed in claim 3 wherein said optimal angle is calculated to point said antenna means to ground approximately at a maximum range of wind shear detection processing.

5. An airborne wind shear detection weather radar as claimed in claim 1 wherein said transmitter/receiver means selects a pulse width of said transmitted signal so as to provide for a resolution of less than approximately one-tenth of a typical microburst diameter.

6. An airborne wind shear detection weather radar as claimed in claim 1 wherein said transmitter/receiver means selects a pulse repetition frequency of said transmitted signal so as to provide unambiguous doppler frequency resolution capability for speeds of up to a minimum of 250 knots.

7. An airborne wind shear detection weather radar as claimed in claim 1 wherein said transmitter/receiver means selects a frequency of said transmitted signal to be fully coherent to provide doppler frequency resolution capability corresponding to a velocity of less than five knots.

8. An airborne wind shear detection weather radar as claimed in claim 1 wherein said transmitter/receiver means comprises detection capability for targets with as little as 0dbZ reflectivity.

9. An airborne wind shear detection weather radar as claimed in claim 1 wherein said display/alert means is capable of receiving information during weather detection modes as well as during wind shear detection modes.

10. An airborne wind shear detection weather radar as claimed in claim 1 wherein said transmitter/receiver means uses a coherent detection method to generate quadrature phase signals, and said doppler signal processor means samples and stores data time intervals corresponding to a range resolution of wind shear detection processing.

11. An airborne wind shear detection weather radar as claimed in claim 1 wherein said doppler signal processor means converts time domain data into frequency domain data.

12. An airborne wind shear detection weather radar as claimed in claim 1 wherein said wind shear threshold processor means analyzes wind velocity data for all range bins for each azimuth angle.

13. An airborne wind shear detection weather radar as claimed in claim 1 wherein said wind shear threshold processor means uses a sliding window calculation.

14. An airborne wind shear detection weather radar as claimed in claim 13 wherein said sliding window calculation has a window width compatible with the size of a typical microburst diameter.

15. An airborne wind shear detection weather radar as claimed in claim 14 wherein said window width is one nautical mile.

16. An airborne wind shear detection weather radar as claimed in claim 1 wherein said wind shear threshold processor calculates differences between maximum and minimum wind velocities for range bins in a window and said differences between maximum and minimum wind velocities is compared against thresholds for wind shear.

17. An airborne wind shear detection weather radar as claimed in claim 1 wherein said wind shear threshold processor means detects changes from tail wind to head wind conditions across a window.

* * * * *